(12) United States Patent
Møller (10) Patent No.: US 6,468,042 B2
(45) Date of Patent: Oct. 22, 2002

(54) METHOD FOR REGULATING A DELIVERY VARIABLE OF A PUMP (75) Inventor: Eik Sefeldt Møller, Sønderborg (DK)

(73) Assignee: Danfoss Drives A/S, Graasten (DK)

( * ) Notice: Subject to any disclaimer, the term of this patent is extended or adjusted under 35 U.S.C. 154(b) by 0 days.

(21) Appl. No.: 10/071,520

(22) Filed: Feb. 7, 2002

(65) Prior Publication Data

US 2002/0136642 A1 Sep. 26, 2002

Related U.S. Application Data

(63) Continuation-in-part of application No. 09/611,115, filed on Jul. 6, 2000, now Pat. No. 6,354,805.

(30) Foreign Application Priority Data

Jul. 12, 1999 (DE) .......................................... 199 31 961

(51) Int. Cl.⁷ .............................................. F04B 49/06
(52) U.S. Cl. ................................................. 417/44.11
(58) Field of Search ..................... 318/473; 388/934; 417/32, 44.1, 44.11

(56) References Cited

U.S. PATENT DOCUMENTS

| | | | |
|---|---|---|---|
| 4,626,753 A | * 12/1986 | Letterman | .................. 318/473 |
| 4,663,942 A | * 5/1987 | Kanazawa | |
| 4,738,118 A | * 4/1988 | Kanazawa | |
| 5,158,436 A | * 10/1992 | Jensen et al. | .................. 417/32 |
| 5,563,490 A | * 10/1996 | Kawaguchi et al. | ....... 417/44.1 |
| 5,947,693 A | * 9/1999 | Yang | ........................ 417/44.11 |

FOREIGN PATENT DOCUMENTS

WO       WO 98/04835      * 2/1998

* cited by examiner

*Primary Examiner*—Michael Koczo
(74) *Attorney, Agent, or Firm*—Lee, Mann, Smith, McWilliams, Sweeney & Ohlson (57) ABSTRACT

In a known method for regulating a delivery variable of a pump, which is driven by an electric motor operated with alternating current of variable frequency, especially via a converter, the input power of the motor is measured as the actual value for the delivery variable and is regulated by comparison with a desired value. To avoid the influence of the temperature of the motor on the delivery variable at constant input power, according to the invention upon a change in the temperature in the motor a corresponding compensating variable is taken into account in the control for the purposes of correcting the input power. As an alternative, associated values of the input power and the speed of the motor at a predetermined desired pressure value are determined empirically and stored as a table, and during operation a value of the input power belonging to a measured or approximately calculated speed of the motor is retrieved from the table as desired for regulating the input power.

3 Claims, 8 Drawing Sheets

METHOD FOR REGULATING A DELIVERY VARIABLE OF A PUMP

This application is a continuation-in-part of U.S. patent application Ser. No. 09/611,115, filed Jul. 6, 2000, U.S. Pat. No. 6,354,805.

BACKGROUND OF THE INVENTION

The invention relates to a method for regulating a delivery variable of a pump, which is driven by an electric motor operated with alternating current of variable frequency, especially via a converter, wherein the input power of the motor is measured as the actual value for the delivery variable and is regulated by comparison with a desired value.

The delivery variable can be the flow rate or the pressure of the pump, although this is not measured directly.

A method of that kind is known from WO 98/04835. In that publication, the electro-motor driving the pump is an induction motor (asynchronous motor), which is driven via a frequency transformation means in the form of a converter as the adjusting element. To manage without a sensor for measuring the delivery variable, the output power or the output current of the converter and the input power or input current of the motor are measured and, by means of a table, stored in a memory, of associated current intensities (or outputs) and output frequencies of the converter, the output frequency is changed is such a way that it corresponds with the desired operating point. In this connection, it is assumed that there is a clear correlation between the measured current and the speed of the motor: if the input current of the motor rises, this indicates an increase also in the flow rate and hence a fall in pressure in the pipeline system connected to the pump. In the case of a circulating pump, however, for example, in the water circuit of a heating system, a constant pressure is desirable. The output frequency of the converter, and hence the speed of the motor, is therefore increased by the controlling system whenever the input current of the motor rises.

WO 98/04835 is essentially concerned with the measurement of the electric current, but also points out that instead of the current the electric power can serve as the measured variable, without mentioning any advantages for this.

It has been demonstrated, however, that considerable control inaccuracies can occur in the delivery variable, if merely the current is measured as the value for the delivery variable. Fluctuations in the operating voltage constitute one reason for this, especially when the operating voltage is the mains voltage. If the operating voltage falls, for example, by 10%, the input power of the motor also falls by 10%. The controlling system does not register this change if just the current is being measured. The consequence is that the speed of the motor falls and the desired delivery variable of the pump is not maintained. If instead the electric input power of the motor is measured as value for the delivery variable, then changes in the operating voltage are also taken into account.

Although changes in the operating voltage as a source of error in the regulation of the delivery variable when measuring the electric input power of the motor are as a result largely excluded, it has been shown that the operating point of the electro-motor, and hence of the pump, nevertheless departs after a while from the desired operating point. The outcome can be substantial deviations from the desired pressure.

SUMMARY OF THE INVENTION

The invention is based on the problem of improving a method of the kind mentioned in the introduction, without direct measurement of the pressure or flow rate of the pump, that is, without using a pressure sensor or flow rate sensor, but using the input power of the electric motor as control variable, to the effect that the desired operating point of the motor, and hence of the pump, remains stable.

According to the invention, that problem is solved in that upon a change in the temperature in the motor a corresponding compensating variable is taken into account in the control for the purposes of correcting the input power.

This solution is based on the realization that the change in the operating point is the consequence of a change in the ohmic resistance in the stator and rotor of the motor. This change is in turn primarily the consequence of heating of the motor through electrical losses or convective heat, for example, through hot water that is being conveyed by the pump. The electrical losses in the motor, and hence the slip, therefore increase, so that the output power of the motor, its speed and hence also the pressure of the pump, decrease. Heating of the motor therefore has two effects: firstly, losses in the rotor are increased, with the result that less power is delivered to the shaft. With regulation of the input power of the motor in which only the input power is measured, this power loss is not detected. In the case of such regulation, there would therefore be no compensation for the power loss in the rotor. A second effect of heating of the motor is that its slip increases. This means that less power is transferred to the rotor. The input power regulation interprets this erroneously as reduced power requirement and reduces the operating frequency of the motor. The operating point of the pump therefore differs from the desired operating point. The invention compensates for the temperature-dependent pressure fall, without the pressure being measured directly.

This can be achieved in an especially simple manner in that the compensating variable is retrieved up from an empirically prepared, stored table of associated input power change values and temperature values of the motor in dependence on the operating temperature of the motor.

Another possibility is that a table that contains the pressure change of the pump at different input powers of the motor at the time the operating temperature of the motor is reached is empirically prepared and stored, and from the table a pressure change is retrieved in dependence on the actual value of the input power as a compensating variable in the regulation.

A somewhat more accurate solution consists in that from the compensating variable and a frequency control variable an approximate actual speed value is calculated, which, together with a desired pressure value, is used to retrieve an accompanying desired input power value from a stored, empirically prepared table of associated values of input power and speed of the motor.

Another solution to the problem posed consists in accordance with the invention in that associated values of the input power and the speed of the motor at a predetermined desired pressure value are determined empirically and stored as a table, and that during operation the value of the input power belonging to a measured or approximately calculated speed of the motor is retrieved from the table as desired value for regulating the input power. In the case of this solution, previous measurement of the dependency of the pump pressure on the motor temperature is not needed, because the speed of the motor or of the pump is directly measured or approximately calculated and a temperature-dependent change in the output power of the motor is used for compensation.

BRIEF DESCRIPTION OF THE DRAWINGS

The invention and its developments are described in detail hereafter with reference to the accompanying drawings of examples, in which.

DESCRIPTION OF THE PREFERRED EMBODIMENTS

To begin with, the problem on which the method according to the invention is based will be explained in detail with reference to FIGS. 1 to 3.

Figure 1:
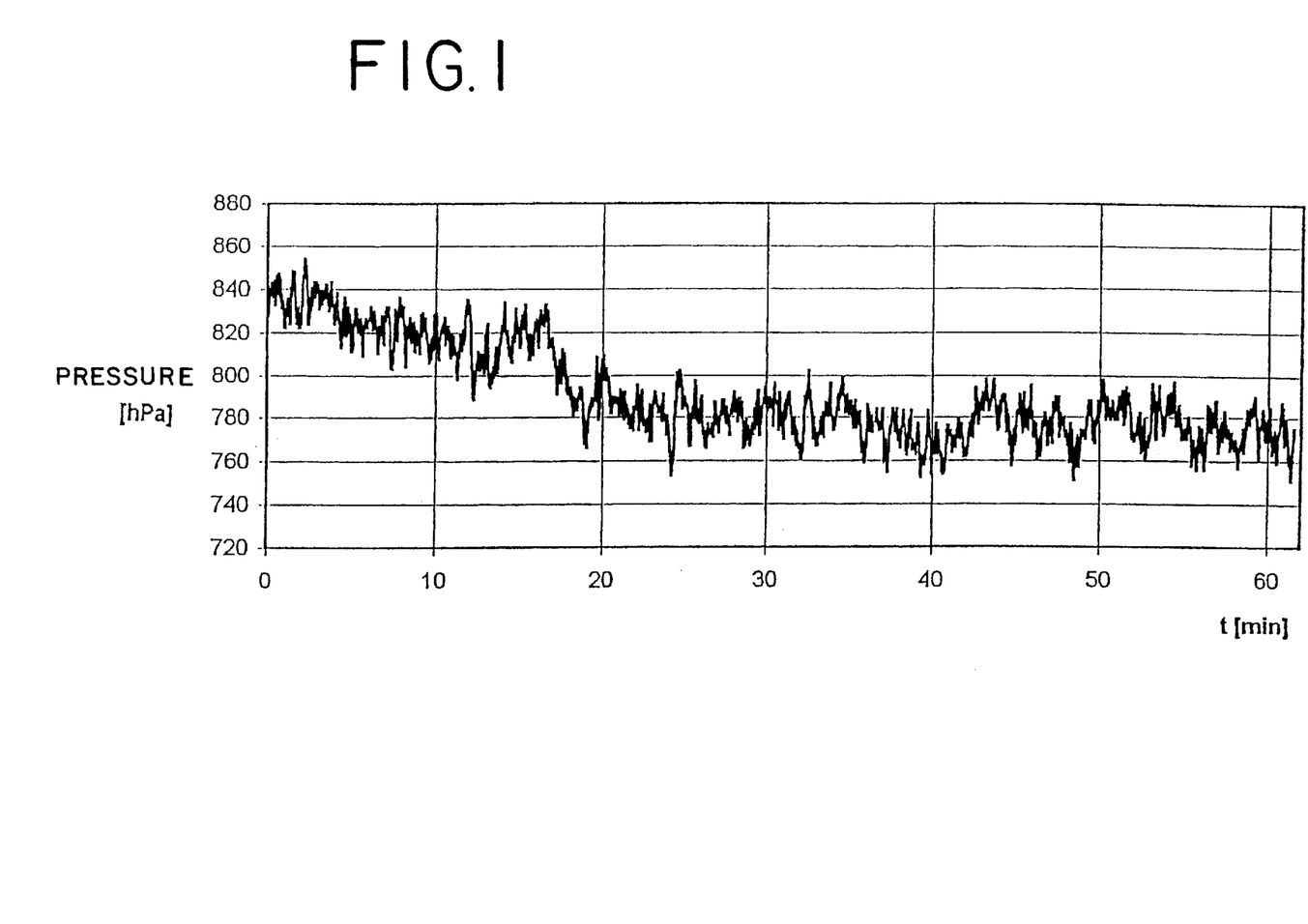
FIG. 1 shows the dependency on time of the pressure of a pump driven by an electro-motor during regulation of a delivery variable of the pump, when the input power of the motor is determined as the measure of the actual value of the delivery variable but changes in the pressure upon change in the temperature of the motor are disregarded.
Figure 2:
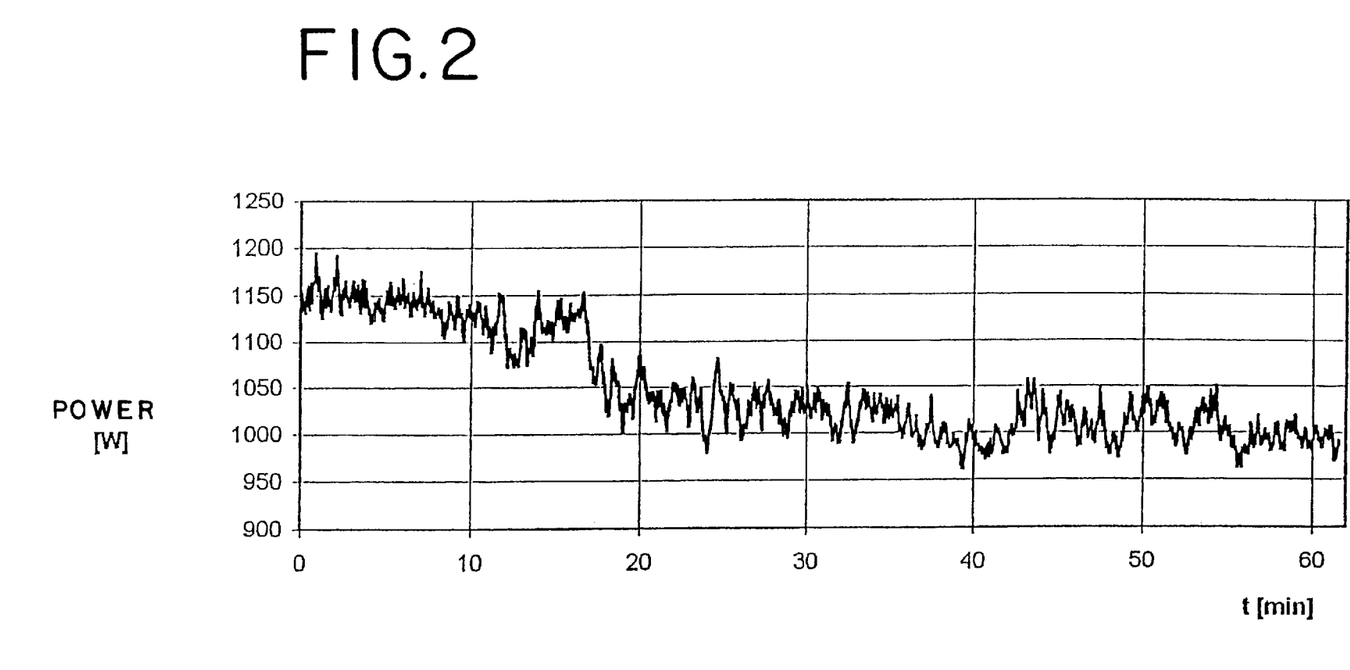
FIG. 2 shows the dependency on time of the input power of the motor, the input power declining during a change in temperature of the motor and therefore causing the pressure fall illustrated in FIG. 1.
Figure 3:
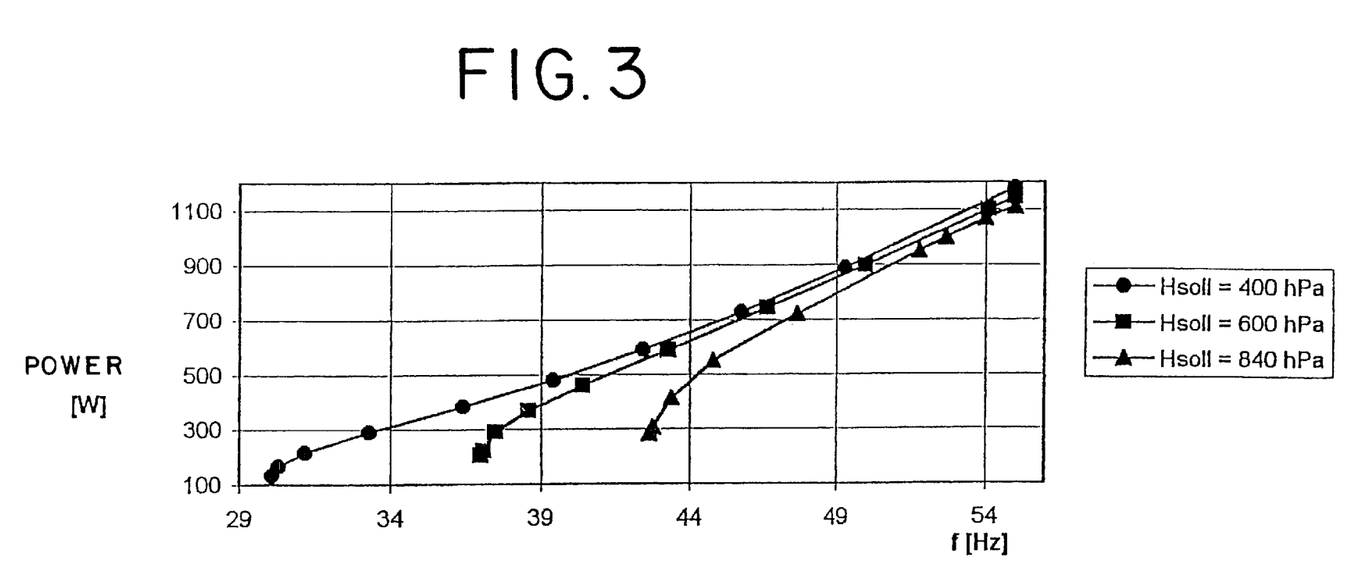
FIG. 3 shows characteristic curves of the dependency of the input power of an asynchronous motor driving a pump on the frequency of its operating voltage for different desired pressure values $H_{des}$ as parameters.

FIGS. 1 to 3 are empirically determined graphs. The graphs of FIGS. 1 and 2 represent the pressure (FIG. 1) and the power delivered to the motor (FIG. 2) in dependence on time t in a conventional regulating method, in which a delivery variable-the pressure or flow rate-of a pump driven by an electric motor is regulated, but the delivery variable is not directly measured. In the known case, the input power P, specifically the effective power and not the apparent or reactive power, of the motor is measured as parameter for the actual value of the delivery variable. The motor being tested is an asynchronous motor (also called an "induction motor"), having a nominal output of 1.5 kW, the speed of which was controlled by changing the frequency of its operating voltage by means of a converter.

According to FIG. 1, from an initial value, pre-set as desired value, of about 840 hPa at time t=0, the pressure H fell on average to about 780 hPa within about 20 to 25 minutes. This pressure fall is a consequence firstly of the lower power delivered to the motor shaft on account of the temperature-induced power losses in the rotor, and secondly of a smaller motor input power available for use. The latter is shown in FIG. 2, according to which the input power falls within the same time from about 1150 W to about 1025 W. This pressure fall is a consequence of the higher slip: the controlling system establishes here that less power is required (because it mistakenly assumes that a load is putting less load on the pump), and reduces the output frequency of the converter. This output frequency is used for looking up in a P-f-table, a smaller desired power value $P_{des}$ being pre-set in order, as shown in FIG. 3, to hold the pressure (on the same characteristic curve) constant. Undesirable positive feedback therefore occurs, by which the power to be delivered to the motor is reduced even further.

A change in the temperature of the motor and consequently in its ohmic resistance has been recognized as a cause of the fall in pressure and power, since the temperature in the stator and in the rotor rises as the running time of the pump increases. The ohmic resistances of rotor and stator consequently also increase in accordance with the equation $$R_{s,\upsilon}=R_{s,20}(1+\alpha_{20}\Delta\upsilon) \quad (1)$$

in which $\alpha_{20}$ is the temperature coefficient for the resistance material at an ambient temperature of 20° C. and $\Delta\upsilon$ is the temperature change. For example, the temperature coefficient of copper is 0.00393/° C., and of aluminium 0.00403/° C. at 20° C. The stator temperature can assume values in the range from 20° C. to 120° C. The rotor temperature can accordingly assume values of 20° C. to 220° C., with the result that the rotor resistance can vary by about 81%. Thus, losses in the motor are substantially a result of losses in the rotor and stator, and can amount to about 40%. A higher rotor resistance $R_r$ also results in an increase in the slip s of the asynchronous motor. The following equation applies to the slip s:

$$s = \frac{m \cdot (I_r)^2 \cdot R_r}{P_s} \quad (2)$$

in which m is the number of phase windings, $I_r$ is the rotor current, $R_r$ is the rotor resistance and $P_s$ is the power transferred from the stator via the air gap to the rotor.

Since the slip is proportional to the rotor resistance, it too can consequently change by about 40%. In the case of smaller motors, the slip can be about 10%; this means that the temperature rise causes a further change in the speed by about 4% at rated loading.

The following equation (3) represents approximately the input power of a flow-type machine driven by an electric motor (on the assumption that the efficiency is constant):

$$\frac{P_1}{P_2} = \frac{(n_1)^3}{(n_2)^3} = \frac{((1-s_1) \cdot f_1)^3}{((1-s_2) \cdot f_2)^3} \quad (3)$$

In this equation, $P_1$, $n_1$, $s_1$ and $f_1$ denote the variables of power, speed, slip and frequency respectively at a first operating point, and $P_2$, $n_2$, $s_2$ and $f_2$ represent these variables at a second operating point.

In the case of a pump driven by an electro-motor, the input power, in order to compensate for a decrease in speed by 4%, would have to increase according to equation (3) by $((1.04)^3-1)$, that is 12.5%. If the output power of the motor consequently decreases by 12.5% because of a temperature rise, this also has a marked influence on the pressure of the pump, since the power-frequency characteristic curves (P-f-characteristic curves) for desired pressure values $H_{des}$ that lie relatively far apart lie very close to one another as shown in FIG. 3.

Figure 4:
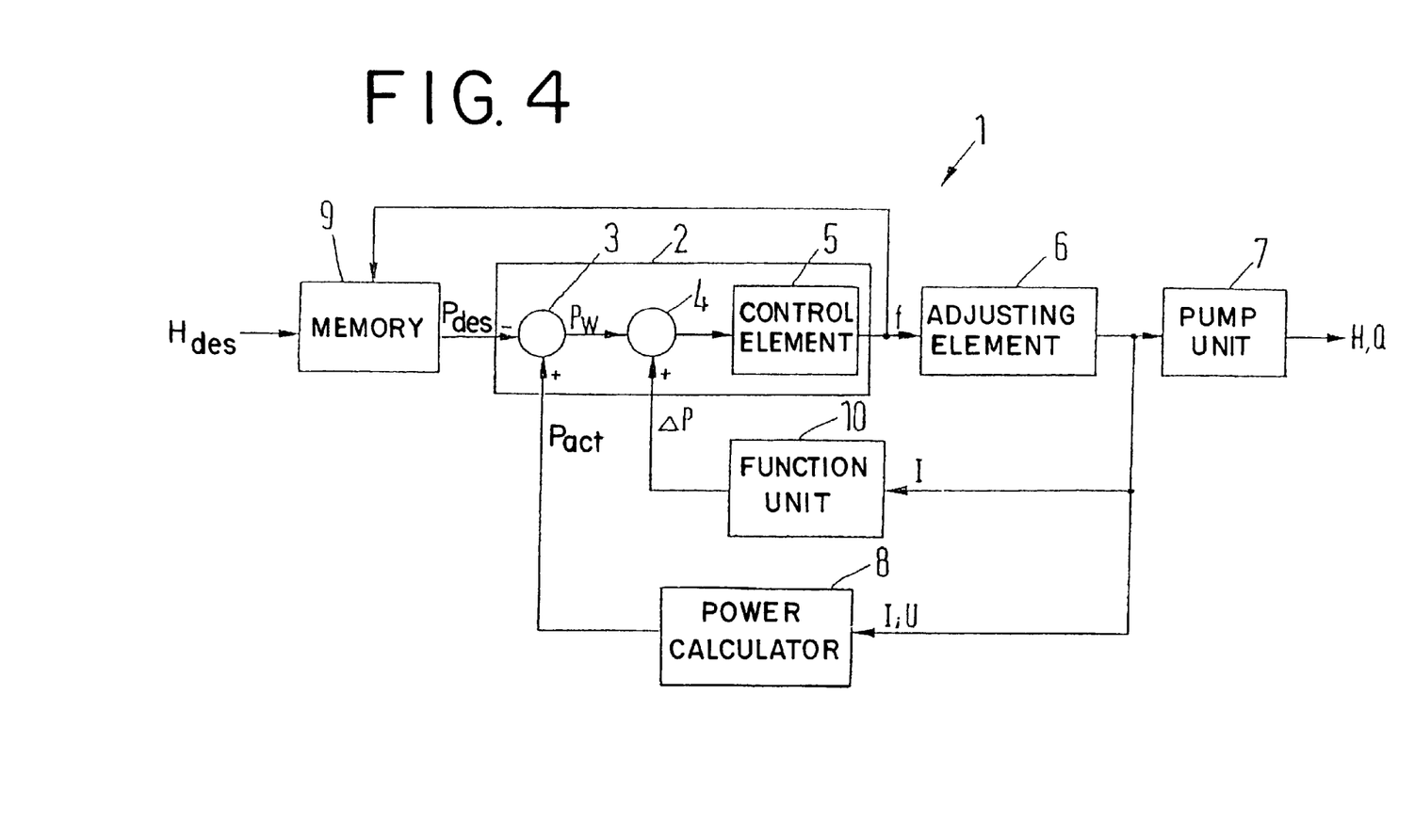
FIG. 4 is a block diagram to explain a first exemplary embodiment of the method according to the invention.

The first exemplary embodiment of the method according to the invention, in which the influence of changes in temperature on the pressure and the delivery value is avoided, is explained in detail hereafter with reference to FIG. 4.

According to FIG. 4, a controlling system 1 contains a controller 2 having a summing element 3, a summing element 4 and a control element 5. The summing element 3 and the summing element 4 lie in series on the input side of the control element 5. The control element 5 contains a control amplifier, which has a negative feedback (degenerative feedback) that determines the response of the control element so that it acts, for example, as a PI element.

The controller 2 is followed by an adjusting element 6, which contains a frequency-controlled converter, which in its turn contains a multi-phase rectifier for rectification of an alternating voltage, a d.c. intermediate circuit and an inverter. The rectifier effects the rectification of an alternating voltage, for example, the ordinary mains voltage, into a direct voltage, which the inverter converts into an alternating voltage of a frequency f, which is determined by the output signal of the controller 2. The output alternating voltage of the inverter or rather of the adjusting element 6 forms the operating voltage U for the electric motor of a pump unit 7, which motor drives a pump in the pump unit 7 so that it operates with a predetermined delivery variable, a pressure H or flow rate Q. So that the delivery variable need not be measured in the control process directly by means of a pressure or flow rate sensor, the input power of the motor of the pump in the pump unit 7 or the output power of the adjusting element 6 is determined as the parameter for its actual value, to be precise, by measuring the voltage U and the current I between adjusting element 6 and pump unit 7. From these measured values, an actual power value $P_{act}$ is calculated in a power calculator 8, or, more accurately, with the power factor cos φ known, the effective power is calculated from the product of voltage U and current I. Alternatively, the effective power could also be determined directly by measuring the direct voltage and the direct current in the d.c. intermediate circuit.

The actual power value $P_{act}$ is supplied to one input of the summing element 3 and there compared with the desired power value $P_{des}$ supplied to the other input of the comparator 3 in order, independence on a control error $P_w$, to correct the power on the input side of the pump unit 7 by corresponding change in the frequency f on the output side of the converter in the adjusting element 6 until the control error $P_w$ has been at least approximately compensated. Since, in order to achieve and maintain the desired pressure H of the pump, the desired frequency f of the operating voltage of the motor in the pump unit 7 is used instead of the required input power as control variable for the adjusting element 6, there is stored in a memory 9 an empirically prepared table of the correlation between the input power of the pump unit 7 and the frequency f for different desired pressure values $H_{des}$ as parameter in accordance with the characteristic curves illustrated in FIG. 3. From the stored P-f-table, in dependence on the frequency control signal f appearing at the output of the controller 2 and on the desired pressure value $H_{des}$, both of which are supplied as addresses to the memory 9, the associated desired power value $P_{des}$ is then retrieved and supplied to the summing element 3. But since the delivery variable of the pump unit, or rather of the pump, can be different on account of heating of the motor through running thereof and the resultant change in its resistance in rotor and stator even when the input power of the motor is constant, according to the invention a compensating variable ΔP dependent on the temperature of the motor is superimposed on the control error $P_w$ (added or subtracted) by the summing element 4. To determine the compensating variable ΔP, a function unit 10 is provided, which contains in a memory a compensating variable ΔP belonging to each temperature value T of the motor in the form of an empirically prepared table, from which, in dependence on the temperature T ascertained, the associated compensating variable ΔP is retrieved. The temperature T can either be measured directly in the motor, or, as in the present example, can be ascertained by measuring the input current I of the pump unit and forming the integral by means of the square of the current I with time. Compensation by means of the compensating variable ΔP can be carried out either continuously or when the electro-motor has reached its running temperature.

Figure 4A:
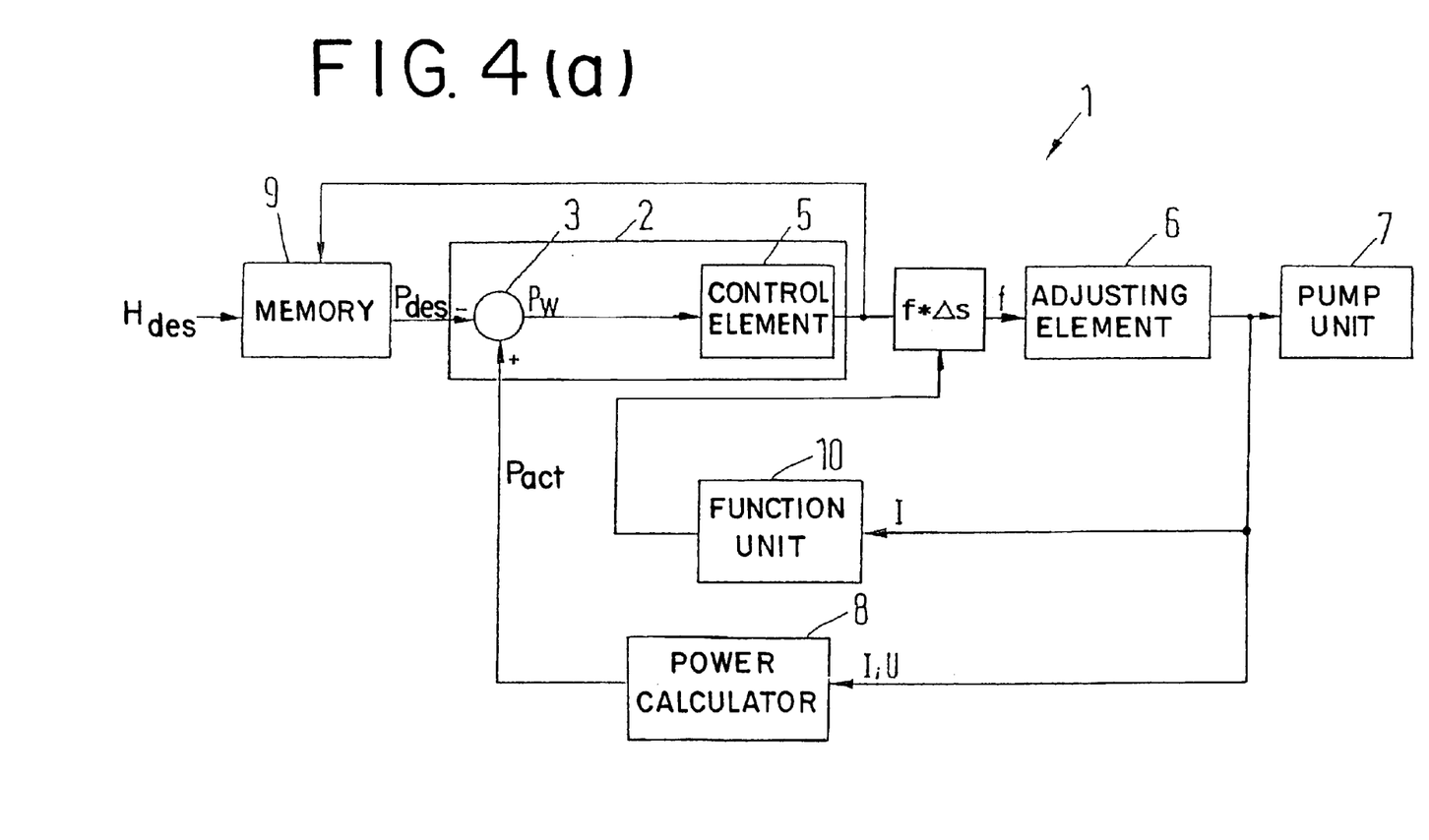
FIG. 4(a) is a block diagram to explain a modified version of the first exemplary embodiment of the invention.

The compensating variable ΔP can also be supplied to the controller 2 at a different point, for example, upstream of one of the inputs of the summing element 3. FIG. 4(*a*) is similar to FIG. 4 except that a compensating variable Δs, which is the temperature dependent change in slip, is utilized rather than the change in power, ΔP. The function 10' contains in a memory the compensating variable Δs belonging to each temperature T of the motor. This compensating variable is just a number, e.g. 1.1 at 100° C. and 0.95 at 10°° C. Temperature, compensating variable pairs (T, Δs) are located in a table in the memory, and the entrance into the table is via the measured or estimated motor temperature, which in FIG. 4(*a*) is calculated via the current I. The compensating variable Δs is multiplied by the frequency output from the controller 2 to produce the change in frequency f.

Figure 5:
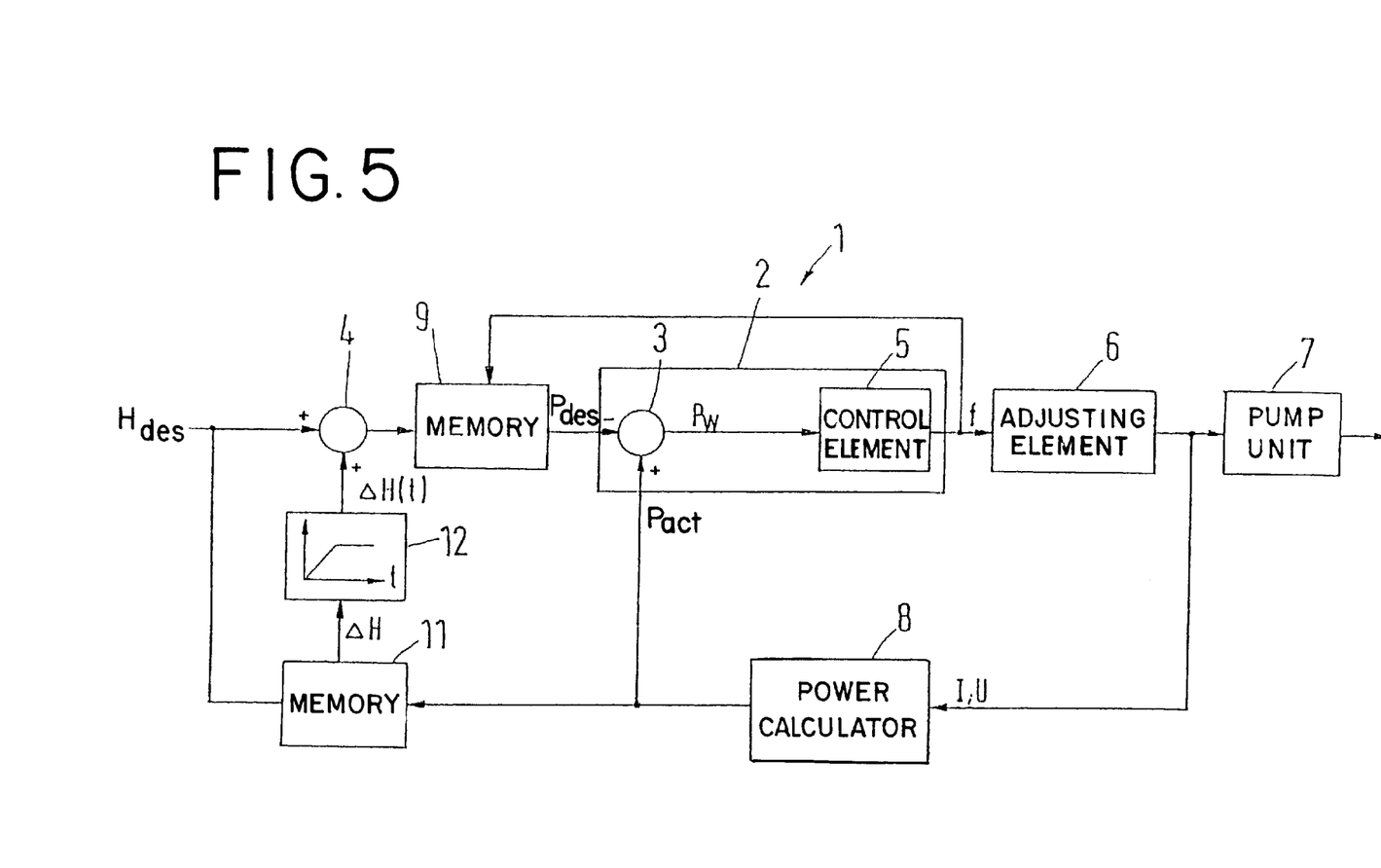
FIG. 5 is a block diagram to explain a second exemplary embodiment of the method according to the invention.

FIG. 5 is a block diagram of a second embodiment, in which empirically determined associated values of the input power P of the pump motor and of compensating variables in the form of pressure changes ΔH belonging to each desired pressure value $H_{des}$ are stored in a memory 11. For the relevant desired pressure value $H_{des}$ and the respective actual power value $P_{act}$ determined by the power calculator 8, the associated compensating value ΔH is then retrieved from the memory 11 and, by means of a transfer element 12 having a predetermined transfer function, is supplied as a time-dependent compensating variable ΔH(t) to the summing element 4, in this case positioned in front of the memory 9; the summing element adds the time-dependent compensating variable ΔH(t) to the respective desired pressure value $H_{des}$ and, in dependence on the desired pressure value corrected in this way and on the frequency control signal f, retrieves the associated compensated desired power value $P_{des}$. The compensating variable ΔH is in this case the pressure fall that can be measured when the rotor and the stator windings of the motor in the pump unit 7, which motor drives the pump, have reached their operating temperature. This pressure fall depends on the power with which the pump is operated. For each measured power, the accompanying pressure fall ΔH is therefore empirically determined as a ΔH-P-table. As FIG. 1 shows, the pressure fall is about 60 hPa after about 20 minutes at a predetermined pressure $H_{des}$ of 840 hPa. By using the desired pressure value $H_{des}$ and the actual power value $P_{act}$ as addresses for the memory 11, the value 60 hPa is then obtained as compensating variable ΔH, which is added to the desired pressure value $H_{des}$. Because of the interposed transfer element 12, the full magnitude of the compensating variable ΔH is not added immediately, but ascending linearly, until the transfer function of the transfer element 12, in the time required for the motor to reach its operating temperature, has reached the full transfer coefficient of 1 at the break point in the transfer function. The gradient of the transfer function of the transfer element 12 to the break point is in this case chosen so that it corresponds to the gradient ΔH/Δt in FIG. 1, here the downward slope, of the pressure until the operating temperature of the motor has been reached.

Otherwise, the method according to FIG. 5 corresponds to the method according to FIG. 4.

Whereas in the two exemplary embodiments according to FIGS. 4 and 5 the power is controlled using a P-f-table in memory 9, it is also possible to regulate the power on the basis of a P-n-table, in which n is the speed of the motor or of the pump unit 7.

Control according to a P-n-table is more accurate than according to a P-f-table, as is apparent from the equations (4), (5) and (6) given below, in which the indices "1" and "2" apply to different operating points. Thus, equation (4) describes the relationship of two flows $Q_1$ and $Q_2$, equation (5) describes the relationship of two pressures $H_1$ and $H_2$, and equation (6) describes the relationship of two powers $P_1$ and $P_2$ in dependence on the relationship of two speeds $n_1$ and $n_2$ and two operating frequencies $f_1$ and $f_2$ respectively at the two operating points:

$$\frac{Q_1}{Q_2} = \frac{n_1}{n_2} \approx \frac{f_1}{f_2} \tag{4}$$

$$\frac{H_1}{H_2} = \left(\frac{n_1}{n_2}\right)^2 \approx \left(\frac{f_1}{f_2}\right)^2 \tag{5}$$

$$\frac{P_1}{P_2} = \left(\frac{n_1}{n_2}\right)^3 \approx \left(\frac{f_1}{f_2}\right)^3 \tag{6}$$

It is apparent that the frequency f can be used only approximately as a measure of the flow rate, the pressure or the input power. From equation (3) is follows that the approximation applies only to the case in which the slip is the same at both operating points. If a control is therefore applied, in which the speed n of the motor is measured or an approximate value of the speed is used instead of the frequency control variable f of the motor, a more accurate control of the pressure or flow rate is possible, because the control frequency f on the basis of temperature change influences does not correspond exactly to the delivery variable (pressure or flow rate) of the pump unit. Because the slip s of an electro-motor changes with its torque and temperature (see equation (2)), when the frequency control variable f is known a sufficiently accurate approximate value $n_a$ of the speed can be determined.

Figure 6:
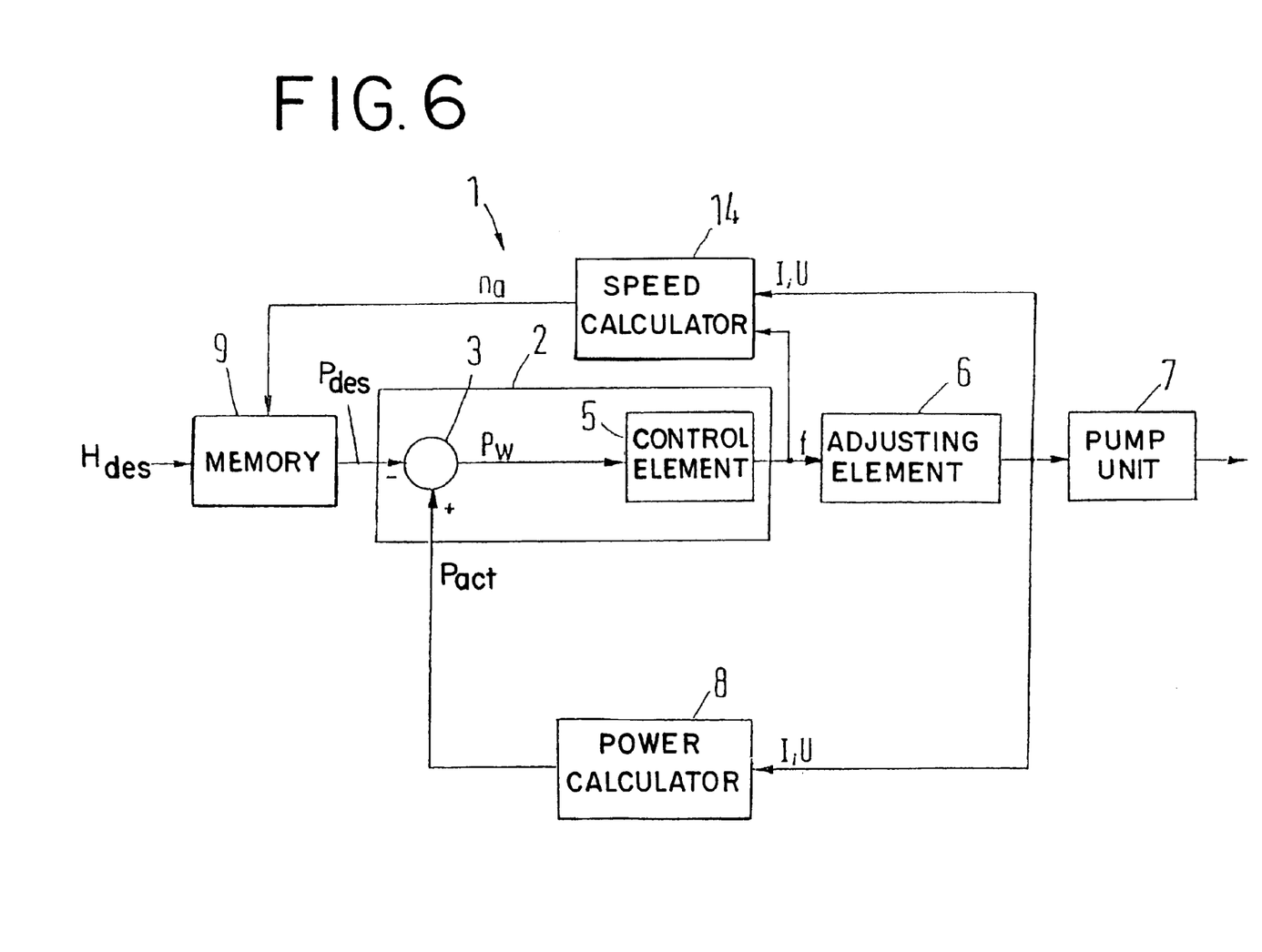
FIG. 6 is a block diagram to explain a third exemplary embodiment of the method according to the invention.

FIG. 6 therefore shows a further exemplary embodiment of the method according to the invention in the form of a block diagram, in which a table of associated values of power P and speed n, determined empirically for each desired pressure value $H_{des}$, is stored in the memory 9. The speed can be measured by means of a speed sensor directly at the shaft of the pump unit 7 or by means of a magnetic field sensor in the stator. In the example illustrated in FIG. 6, an approximate value $n_a$ is determined indirectly, however, namely by a speed calculator 14 in accordance with the following equation:

$$n_a = \frac{60 \cdot (1 - s_a) \cdot f}{p} \tag{7}$$

In this equation, p is the number of poles and $s_a$ an approximate value for the slip of the motor. To calculate the approximate value $s_a$ of the slip, the voltage U and the current I on the input side of the motor are measured and supplied together with the frequency control variable f to the speed calculator 14. From these variables, after determining a temperature-dependent compensating variable $\Delta R = R_{s_{20}} \cdot \alpha \cdot \Delta \upsilon$ of the rotor resistance $R_r$ according to equation (1), from which, together with the iron and copper losses, according to equation (2) the approximate value $s_a$ of the slip is calculated, the speed calculator 14 calculates the approximate value $n_a$ of the speed. By means of the approximate speed value $n_a$, the desired power value $P_{des}$ belonging to the particular desired pressure value $H_{des}$ is retrieved from the empirically determined P-n-table stored in the memory 9.

Otherwise, the method is again the same as in the preceding exemplary embodiments.

Figure 7:
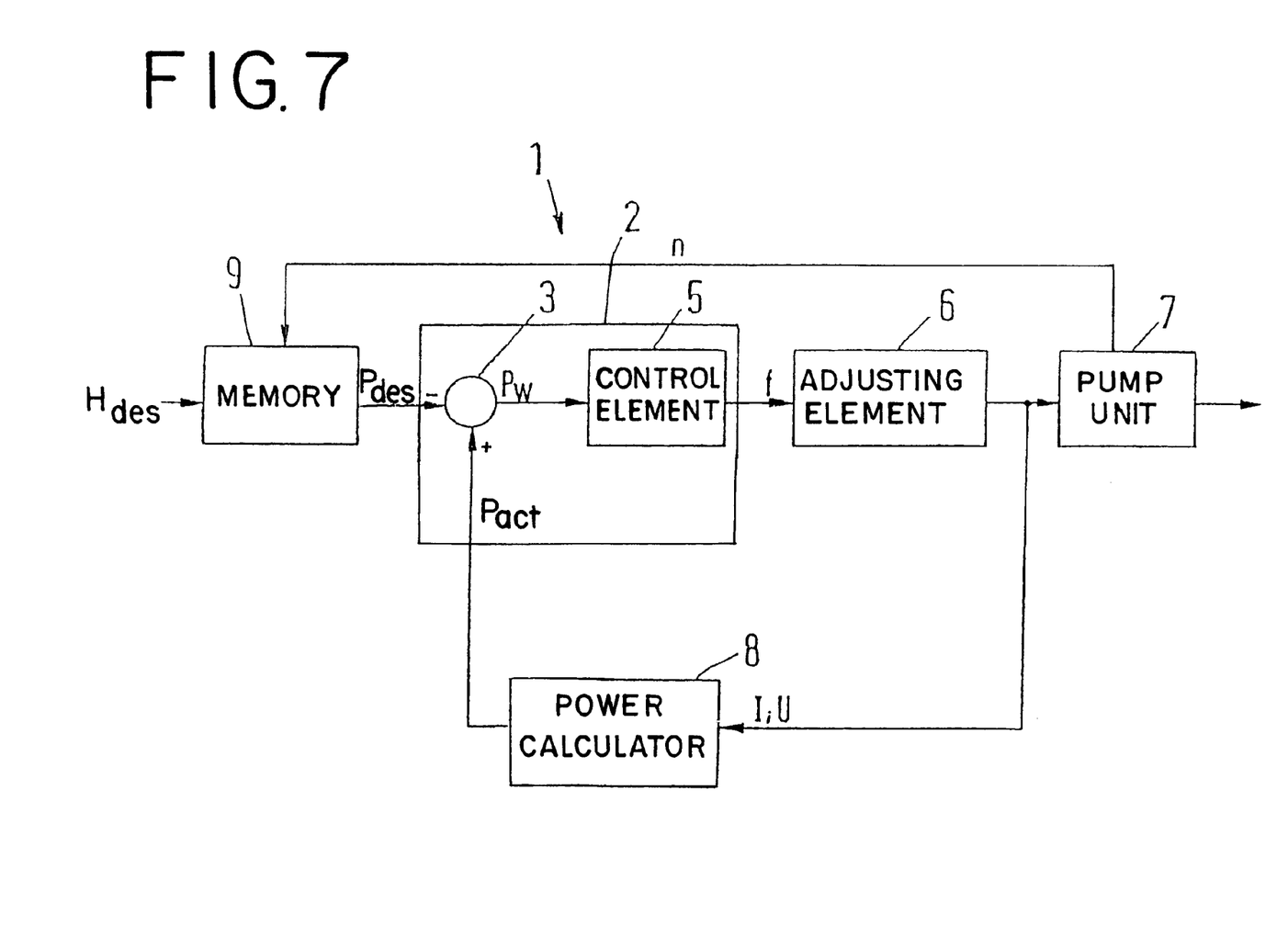
FIG. 7 is a block diagram to explain a fourth exemplary embodiment of the method according to the invention.

The block diagram shown in FIG. 7 illustrates a modification of the method shown in FIG. 6, in which the speed n of the pump unit is measured directly and fed to the memory 9. In this case, calculation or measurement of the temperature of the motor is omitted, and regulation of the delivery variable is more accurate.

If a synchronous motor is used instead of an asynchronous motor to drive the pump in the pump unit 7, temperature compensation can be omitted, because in the case of a synchronous motor no slip occurs. Accordingly, the speed calculator 14 can be omitted and the frequency control variable f can be supplied to the memory 9 directly.

In all exemplary embodiments, the effective power at the input of the motor or rather the pump unit 7 is used as control variable. Since the torque is M=P/n, the torque M can also be used instead of the effective power P. In both cases the control and compensation is the same.

What is claimed is:

1. A method for regulating a delivery variable of a pump, which is driven by an electric motor operated with alternating current of variable frequency, comprising the steps of measuring input power of the motor as an actual value for the delivery variable, regulating the input power by comparison with a desired value, and, upon a change in temperature in the motor, taking a corresponding compensating variable into account in control of the motor for the purposes of correcting the input power, the compensating variable comprising a change in slip.

2. A method according to claim 1, wherein the compensating variable comprising a change in slip is multiplied with a control frequency, the result of the multiplication being a compensated frequency indicating the speed of the electric motor.

3. A method according to claim 2, in which the compensating variable is retrieved from a stored table of associated slip change values and temperature values of the motor in dependence on the temperature of the motor.

* * * * *